H. W. HARKNESS.
Bomb Lance.
No. 19,363.
Patented Feb. 16, 1858.
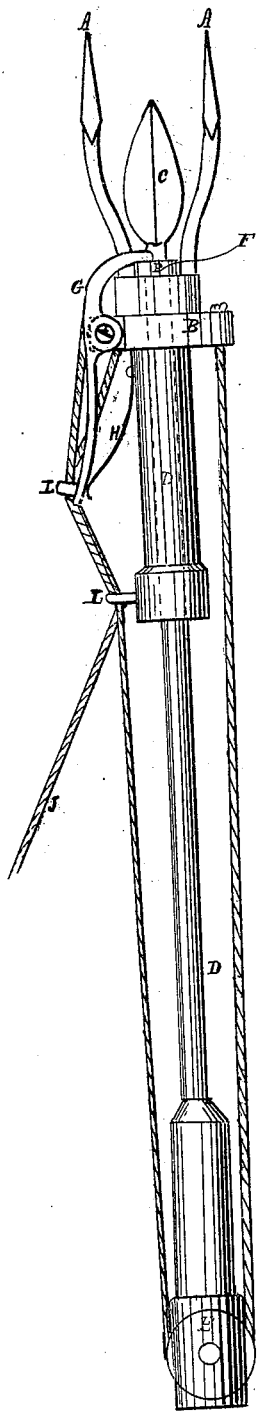
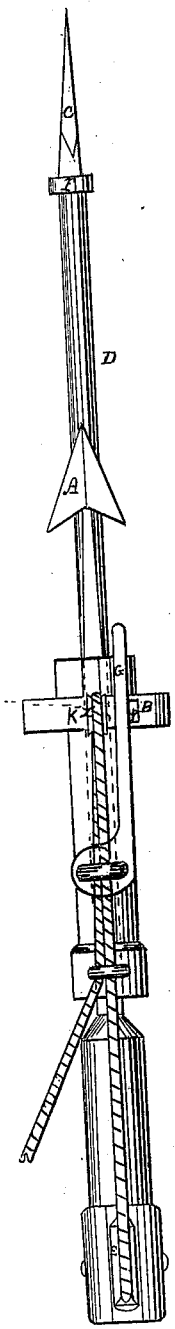
Inventor
H. W. Harkness

UNITED STATES PATENT OFFICE.

H. W. HARKNESS, OF BRISTOL, CONNECTICUT.

IMPROVED HARPOON AND LANCE.

Specification forming part of Letters Patent No. 19,363, dated February 16, 1858.

*To all whom it may concern:*

Be it known that I, HIRAM W. HARKNESS, of Bristol, county of Hartford, State of Connecticut, have invented a useful Improvement in the Construction of Harpoons; and I do hereby declare that the following is a full and exact description thereof, reference being had to the accompanying drawings and letters of reference marked thereon.

The nature of my improvement consists in arranging a lance between two barbed spears in such a manner as that, when it is thrown and is made fast in the fish or whale by the tension of the boat-line, the lever relaxes its hold of the collar on the lance-rod, and by the continued tension of the boat-line and the resistance of the fish or whale causes the lance to penetrate to the vitals.

To enable others skilled in the art to make and use my improvement, I will proceed to describe its construction and operation.

Figure 1 is a front elevation. Fig. 2 is a side elevation.

A A are barbed spears; B, thimble; C, lance; D, lance-rod; E, pulley; F, collar on lance-rod; G, catch-lever; H, spring; J, boat-line; K, small pulley; L L, guides for ropes.

The barbed spears A A are constructed in the usual manner and attached to the thimble D. C is the lance attached to the rod D, which is made so as to slide free and easy through the thimble B, and is held up in a fixed position by the catch-lever G and spring H. The lever G is secured to one side of the thimble B, and its catch takes hold upon the collar F on the lance-rod D. The end of the rope J is made fast in the thimble B opposite to the lever G, passing around the pulley E, thence through the guides L L, around the small pulley K, thence back through guides L L to the coil in the boat. Thus when the instrument is thrown and made fast in the fish or whale the lance C is driven out and penetrates more and more until it reaches the vitals, occasioned by the tension of the rope, which is constantly increasing by the floundering of the fish or whale.

Thus it will be seen that by the use of this instrument the lives of the crew, as well as the safety of the boat, are more secure, and the duration of those fearful struggles greatly diminished, and also great encouragement presented to engage in the pursuit of so hazardous and repulsive an enterprise.

The advantages and utility derived by this arrangement over others now in use are apparent, and cannot fail to be seen, especially by that class of persons who follow fishing or whaling as their business.

I am aware that other devices designed to accomplish similar results have been made; but

What I claim, and desire to secure by Letters Patent, is—

The arrangement of the barbed spears A A, lance C, rod D, lever G, and line J, substantially in the manner and for the purpose as described.

H. W. HARKNESS. [L. S.]

Witnesses:
HENRY A. MITCHELL,
HERVEY E. WAY.